Patented July 21, 1925.

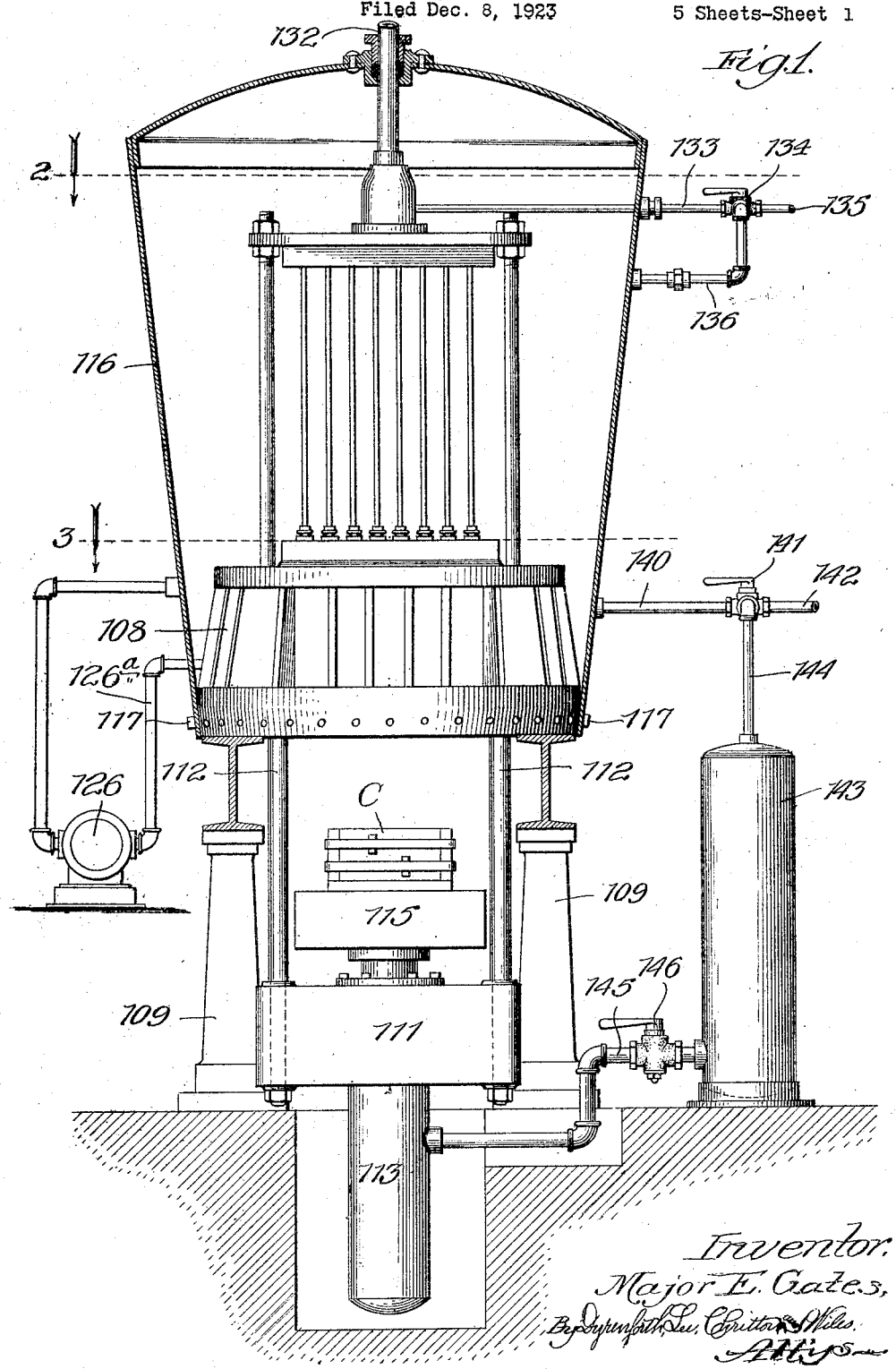

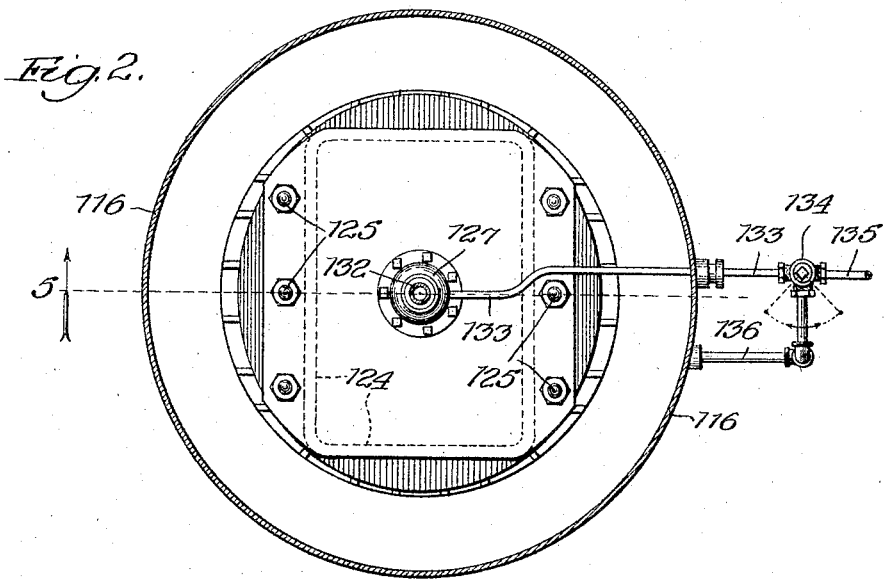
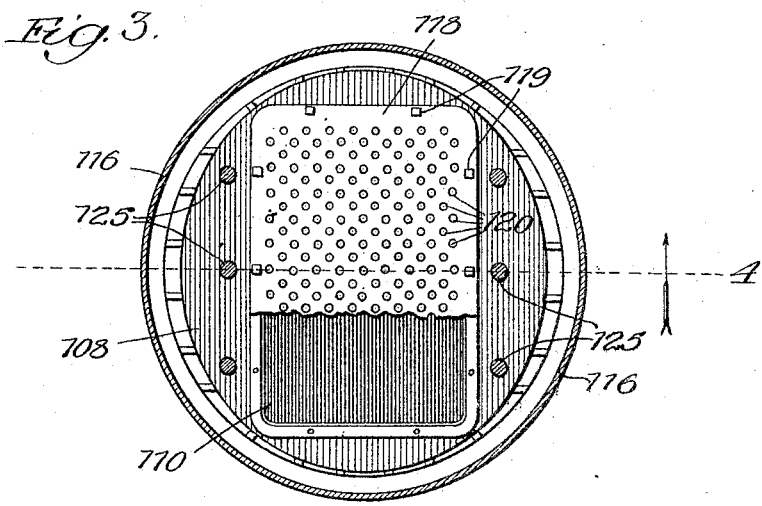

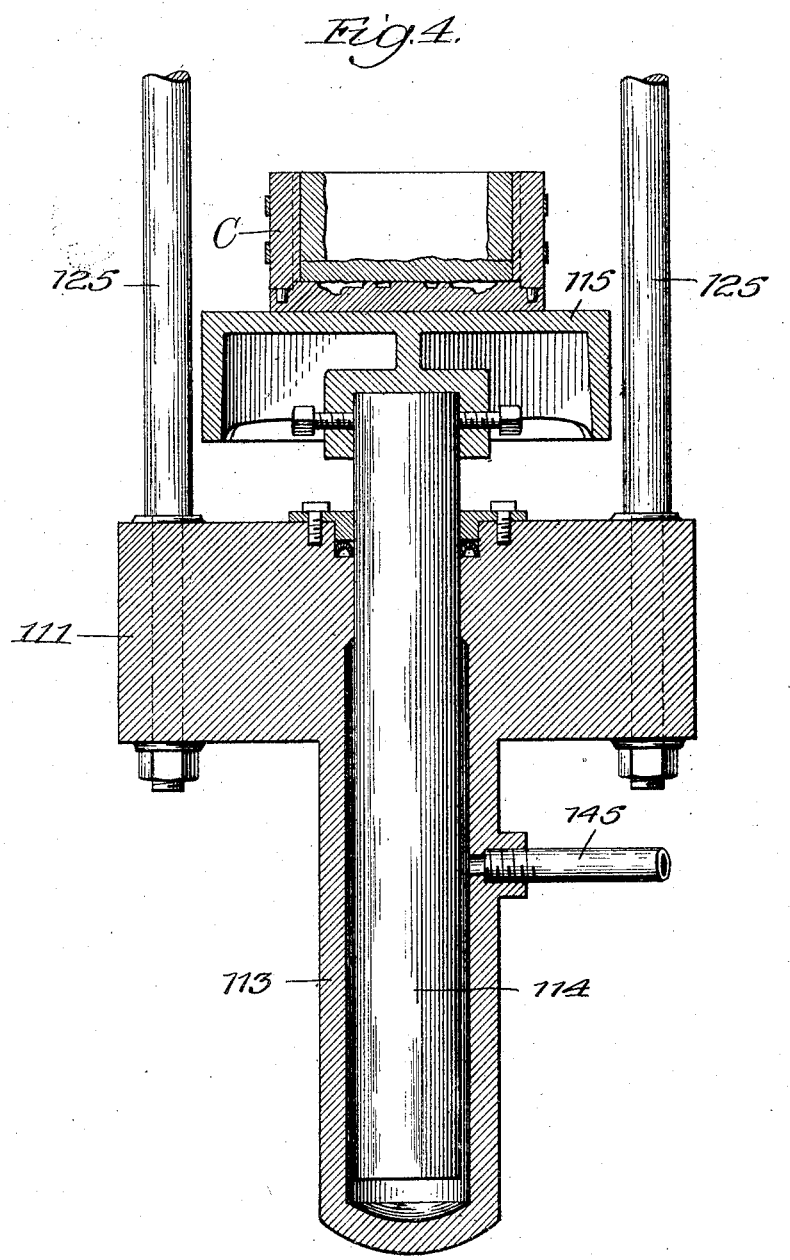

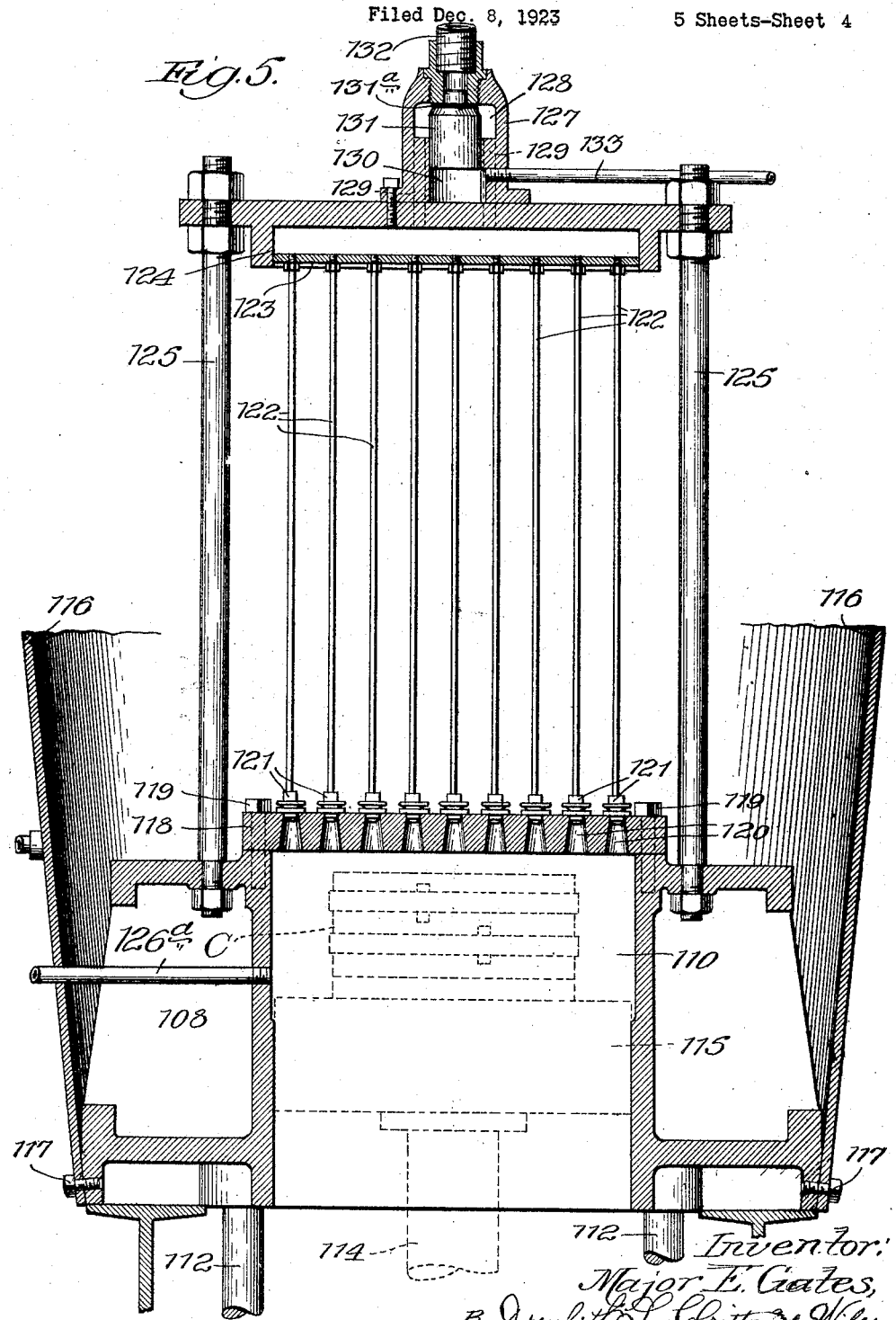

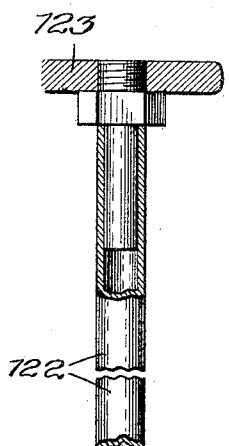
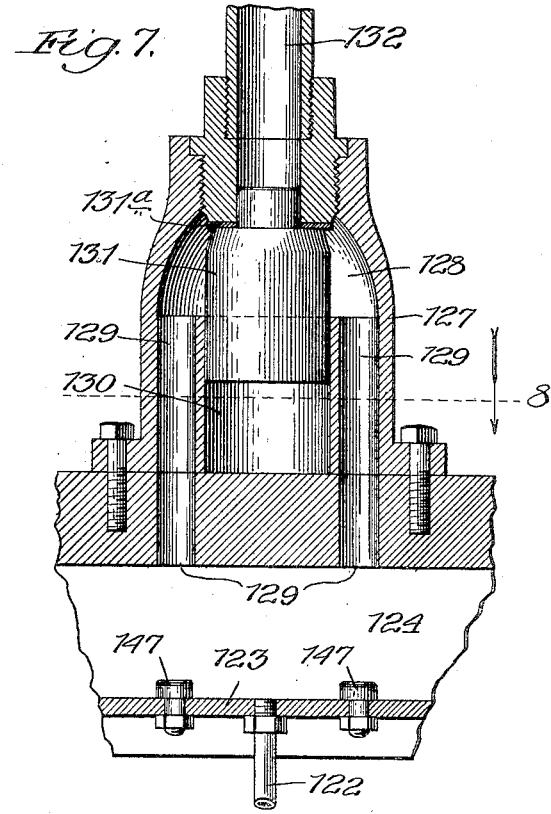
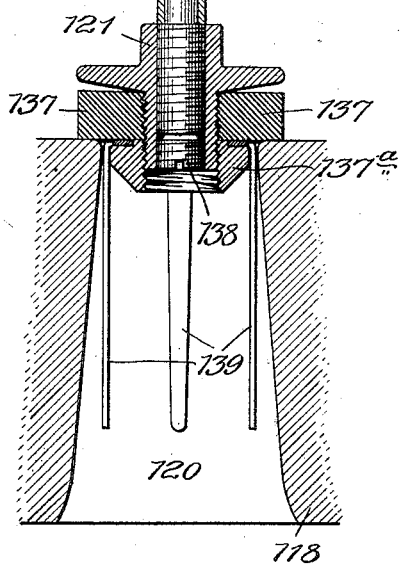
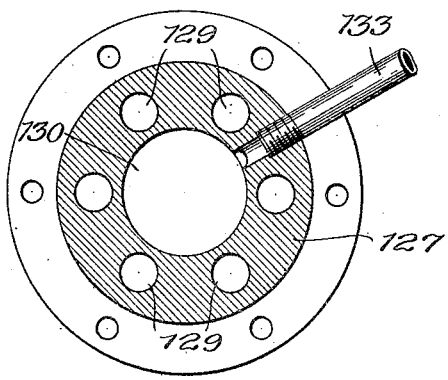

1,546,832

UNITED STATES PATENT OFFICE.

MAJOR E. GATES, OF CHICAGO, ILLINOIS.

METHOD OF AND MACHINE FOR PRESSING PLASTIC MATERIAL INTO MOLDS.

Application filed December 8, 1923. Serial No. 679,348.

*To all whom it may concern:*

Be it known that I, MAJOR E. GATES, a citizen of the United States, residing at Chicago, in the county of Cook and State of Illinois, have invented new and useful Improvements in Methods of and Machines for Pressing Plastic Material into Molds, of which the following is a specification.

This invention relates to machines for pressing plastic material into molds and is particularly adapted to be used for pressing clay into molds such as are used for making terra cotta blocks.

The invention is fully described in the following specification and shown in the accompanying drawings, in which—

Figure 1 is a side elevation partly in section of the machine;

Figs. 2 and 3 are horizontal sections on the lines 2 and 3 of Fig. 1;

Fig. 4 is an enlarged vertical section on the line 4 of Fig. 3;

Fig. 5 is a continuation of Fig. 4 on the line 5 of Fig. 2;

Fig. 6 is an enlarged vertical section of one of the quick opening valves shown in Fig. 5;

Fig. 7 is an enlarged vertical section through the releasing valve and plate diaphragm; and Fig. 8 is a horizontal section on the line 8 of Fig. 7.

The embodiment illustrated comprises a frame 108 supported upon standards 109. This frame has a hollow chamber 110 as shown in Fig. 5 beneath which is suspended a block 111 by means of rods 112. The block 111 carries a cylinder 113 (Fig. 4) in which is slidably mounted a hydraulic plunger 114 the upper end of which carries a platen 115 which is adapted to slide into and completely close the lower part of the chamber 110 as shown in Fig. 5, when the plunger 114 is raised.

The upper portion of the frame 108 is enclosed within a hollow drum 116 which is secured to the frame 108 by means of bolts or rivets 117. The top of the chamber 110 is covered by a valve head 118 which is secured thereon by means of bolts 119. This valve head is provided with a series of openings 120 which are normally closed by means of valves 121 each of which is carried by a hollow stem 122 the upper end of which is secured to a plate diaphragm 123 which is snugly but slidably fitted within the shallow cylinder 124. This is supported above the frame 108 by means of rods 125.

The shell 116 is maintained under a pressure of 75 lbs. per square inch or more by means of a pump 126 which preferably has an intake pipe 126ª leading to the chamber 110. Above the shallow cylinder 124 is located a valve housing 127 having a chamber 128 which communicates with the space above the diaphragm 123 by means of passages 129 (Fig. 7). The housing 128 also has a cylinder 130 in which is slidably mounted a piston valve 131, the upper end of which carries a gasket 131ª and is adapted to close the pipe 132 when the valve is raised as shown in Fig. 7. The cylinder 130 communicates through the pipe 133 with a three-way valve 134. This valve also communicates with the atmosphere through the opening 135 and with the drum 116 through the pipe 136, in a well known manner.

Referring to Fig. 6, the valve 121 is provided with a rubber seat 137, which is held in place by a nut 137ª, the valve 121 being adjustable up and down on the hollow stem 122 and being locked in adjusted position by means of a locking screw 138 which may be reached from the bottom of the chamber 110 when the platen 115 is lowered. Guides 139 are provided which slide within the openings 120 and insure the valve returning to its proper seat when raised.

The drum 116 communicates through a pipe 140 with a three-way valve 141 which communicates with the atmosphere through the pipe 142 and to the reservoir 143 through the pipe 144 and communicating with the cylinder 113 through the pipe 145 in which is placed a quick acting valve 146.

The operation of the device is as follows: A mold C such as is commonly used in making terra cotta blocks, having a plastic material such as clay roughly placed therein, is placed upon the platen 115 while in a lowered position as shown in Fig. 1. The valve 146 is then opened and at the same time air from the drum 116 is admitted to the top of the reservoir 143 which is partly filled with a suitable liquid as water or oil, so that this liquid is forced down into the bottom part of the cylinder 113 thereby lifting the platen 115 into the dotted line position as shown in Fig. 5, when the platen closes the bottom part of the chamber 110.

When the platen has been raised to the desired height the valve 146 is closed thereby locking the platen at this point. At the same time the valve 141 is also turned to closed position.

The valve 134 is now turned so as to permit the pipe 133 to communicate with the atmosphere through the pipe 135 thereby releasing the pressure within the controlling cylinder 130. This pressure which is maintained therein by leakage from the main drum maintains the valve 131 upon its seat. When the pressure in the cylinder 130 is thus reduced to atmospheric pressure the pressure within the chamber 128 upon the top of the valve 131 is sufficient, together with the weight of the valve to cause this valve to drop. As it does so the air above the diaphragm 123 within the shell cylinder 124 which is at the same pressure as the drum 116, rushes out through the passage 129, and the pipe 132 to the atmosphere, thereby causing the pressure within the drum 116 to suddenly lift the diaphragm 123, thus lifting all of the valves 121 and permitting air from the drum 116 to rush through the openings 120 into the chamber 110. Owing to the great suddenness with which these valves are raised and the number of valves employed, the pressure within the chamber 110 is raised to that within the drum 116 in a very small fraction of a second, so that the clay, which has previously been placed in the mold in rolled sheets cut approximately to fit the interior of the mold, will be pressed firmly and uniformly into conformity with the interior contour of the mold.

The diaphragm 123 raises so suddenly that it is necessary to provide some means for stopping it. For this purpose buttons 147 are placed on the diaphragm 123 beneath the openings 129 so that as the diaphragm 123 rises these buttons will enter the passages 129 and will trap some of the air above the diaphragm 123 thereby providing a cushioning means for stopping it.

To lower the valves 121 to seating position, the valve 134 is turned so as to cause the drum 116 to communicate through the pipe 136 and 133 with the cylinder 130. This pressure lifts the valve 131 to the closed position as shown in Fig. 7, the leakage maintaining it in this position although the valve 134 is again closed. Closing this valve permits pressure to build up rapidly in the shallow cylinder 124 above the diaphragm 123, thereby permitting the valves 121 to return to their seats. The locking valve 146 is slowly opened and the three-way valve 141 is turned so as to permit the pipe 144 to communicate with the atmosphere through the pipe 142. The platen 115 now sinks by gravity to the position shown in Fig. 1. The mold C is then removed and a new mold placed on the platen when the cycle of operation is repeated.

By using the pump 126 to partially exhaust the air from the chamber 110 after the platen 115 is raised and immediately before the gaseous pressure is applied, a much greater pressure differential is obtained within the chamber and the proportion of final pressure to the initial pressure is greatly increased. The effect of this is to more thoroughly press the material into the mold.

Owing to the fact that the pressure on all sides of the molds is equalized, molds of a relatively fragile nature may be employed and used repeatedly.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in the invention as broadly as possible in view of the prior art.

What I claim as new and desire to secure by Letters Patent is:

1. The method of pressing plastic material into a mold consisting of placing the plastic material into a mold, placing said mold and plastic material in a confined space and suddenly admitting into said confined space a gas under high pressure so as to cause the plastic material to be pressed into conformance with the contour of said mold.

2. The method of pressing plastic material into a mold consisting of placing the plastic material into a mold, placing said mold and plastic material in a confined space and subjecting said mold and material therein to a suddenly applied gaseous pressure rising uniformly from atmospheric pressure or less to a point well above atmospheric pressure to cause said material to be pressed into the mold.

3. A machine for pressing plastic material into a mold containing the plastic material to be acted upon, said machine comprising means for subjecting the plastic material in the mold to suddenly and directly applied gaseous pressure rising uniformly from atmospheric pressure or less to a point well above atmospheric pressure to force the plastic material into conformance with the interior contour of said mold.

4. A machine for pressing plastic material into molds comprising a chamber having an opening for the insertion of the mold, means for closing said opening, said means serving also to carry said mold, and means for subjecting the plastic material and mold to a suddenly directly applied gaseous pressure to force the plastic material into the mold.

5. A machine for pressing plastic material into molds comprising a chamber having an opening for the insertion of the mold, means for closing said opening, a reservoir under gas pressure communicating with said chamber through a plurality of passages, valves for closing said passages, and means for suddenly opening said valves for subjecting the plastic material and mold to a suddenly directly gaseous pressure to force the plastic material into the mold.

6. A machine for pressing plastic material into molds comprising a chamber having an opening for the insertion of the mold, means for closing said opening, said means serving also to carry said mold, a reservoir under gas pressure communicating with said chamber through a plurality of passages, valves for closing said passages, and means for suddenly opening said valves for subjecting the plastic material and mold to a suddenly directly applied gaseous pressure to force the plastic material into the mold.

7. A machine for pressing plastic material into molds comprising a chamber having an opening for the insertion of the mold, means for closing said opening, a reservoir under gas pressure communicating with said chamber through a plurality of passages, valves for closing said passages, and means operable by the pressure within said reservoir for suddenly opening said valves for subjecting the plastic material and mold to a suddenly directly applied gaseous pressure to force the plastic material into the mold.

8. A machine for pressing plastic material into molds comprising a chamber having an opening for the insertion of the mold, means for closing said opening, a reservoir under gas pressure communicating with said chamber through a plurality of passages, valves for closing said passages, a plate above said valves and attached thereto, a cylinder surrounding said plate, said cylinder and plate lying within said reservoir, and means for varying the pressure within said cylinder for suddenly lifting said valves thereby subjecting the plastic material and mold to a suddenly directly applied gaseous pressure to force the plastic material into the mold.

9. A machine for pressing plastic material into molds comprising a chamber having an opening for the insertion of the mold, means for closing said opening, a reservoir under gas pressure communicating with said chamber through a plurality of passages, valves for closing said passages, a plate above said valves and attached thereto, a cylinder surrounding said plate, said cylinder and plate lying within said reservoir, a passage connecting said cylinder to the atmosphere, and a valve within said passage for opening communication between said cylinder and atmosphere to permit the pressure within said reservoir to lift said plate and valves thereby subjecting the plastic material and mold to a suddenly directly applied gaseous pressure to force the plastic material into the mold.

10. The method of pressing plastic material into a mold consisting of placing the plastic material into a mold, placing said mold and plastic material in a confined space, lowering the air pressure in said confined space, and suddenly admitting into said confined space a gas under high pressure so as to cause the plastic material to be pressed into conformance with the contour of said mold.

11. A machine for pressing plastic material into a mold containing the plastic material to be acted upon, said machine comprising means for lowering the pressure upon the plastic material, and means for subjecting the plastic material in the mold to suddenly and directly applied gaseous pressure to force the plastic material into conformance with the interior contour of said mold.

MAJOR E. GATES.